3,492,284
WATER-SOLUBLE, COPPER-CONTAINING PYRIMI-
DYL REACTIVE DISAZO DYES
Jakob Benz, Oberwil, Basel-Land, Hanspeter Uehlinger, Basel, and Walter Wehrli, Riehen, Basel-Stadt, Switzerland, assignors to Sandoz Ltd. (also known as Sandoz A.G.), Basel, Switzerland
No Drawing. Filed June 15, 1966, Ser. No. 557,626
Claims priority, application Switzerland, July 16, 1965, 10,003/65; Feb. 22, 1966, 2,550/66
Int. Cl. C09b 45/28; D06p
U.S. Cl. 260—146
9 Claims

ABSTRACT OF THE DISCLOSURE

Water-soluble reactive copperized disazo dyes having as a central nucleus 1,6-dihydroxynaphthalene-3-sulfonic acid bound in each of the 2- and 5-positions to separate azo groups are suitable for dyeing leather, wool, silk, polyamide fibers and fibers of natural or regenerated cellulose. The azo group in the 2-position is bound, through the residue of a diazo component, to a halopyrimidyl radical, and that in the 5-position is bound to the residue of a diazo component with respect to which the central nucleus also has a copperized bond.

---

This invention relates to water-soluble, copper-containing reactive dyes of the formula

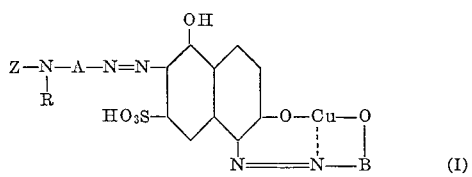

where

A represents a benzene radical which may contain sulfonic acid groups and may be further substituted or a diphenyl, diphenylamine, stilbene or naphthalene radical which contains sulfonic acid groups and may be further substituted,
B an aromatic radical, preferably one of the benzene or naphthalene series, which contains sulfonic acid groups and may be further substituted,
R hydrogen or a lower molecular hydrocarbon radical and
Z a halogenopyrimidyl radical which may be bound through a —CH$_2$— bridge, and where the dye molecule contains at least 4 sulfonic acid groups and
—O— is bound to B in ortho-position to —N=N—.

Especially valuable dyes are of the formula

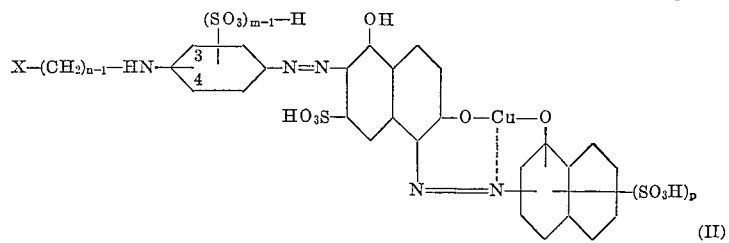

wherein X is a polychloro- or polybromopyrimidyl radical, each of $n$ and $m$ is one of the integers 1 and 2, $p$ is one of the integers 2 and 3, the sum $m+p$ being at least 4, —O— being in ortho-position to —N=N— and —HN— being bound in 3 or 4 position of the benzene nucleus. The process for the production of these dyes consists in coupling the diazo compound of an amine of formula

with a copper-containing dye of formula

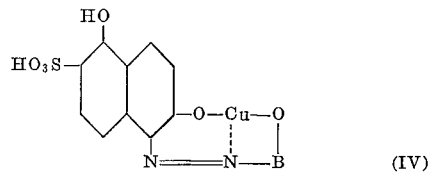

or in coupling the diazo compound of an amine of formula

where Ac represents an acyl radical, with a copper-containing dye of Formula IV, on which the acyl group is split off and the resulting aminodisazo compound reacted with a polyhalogenopyrimidine which may bear a halogenomethyl group. In both forms of the process the starting materials are chosen so that the final dye contains at least 4 sulfonic acid groups. Examples of aromatic diamino compounds on which the diazo compounds of Formulae III and V may be based are 1,3- and 1,4-diaminobenzene, 1,3 - diamino -4-chloro-, -4-methyl-, -4-ethyl-, -4-methoxy- or -4-ethoxy-benzene, 1,4-diamino-2-chloro-, -2-methyl-, -2-ethyl-, -2-methoxy- or 2-ethoxy-benzene, 1,3-diaminobenzene-4-sulfonic acid, 1,4-diaminobenzene-2-sulfonic acid, 2,6-diaminonaphthalene - 4,8-disulfonic acid, 4,4'-diamino-1,1'-diphenyl-3-sulfonic acid, 4,4'-diamino-2,2' - dimethyl- or -2,2' - dichloro- or -2,2'-dimethoxy-1,1'-diphenyl-5-sulfonic acid, 4,4'-diamino-1, 1'-diphenylamino-2-sulfonic acid, 4,4'-diaminostilbene-2, 2'-disulfonic acid.

The acyl radical in Formula V is preferably the acetyl, propionyl, butyryl, ethoxycarbonyl or methoxycarbonyl radical.

The halogenopyrimidyl radical which may be bound through a —CH$_2$— group is preferably a dihalogeno- or trihalogeno-pyrimidyl radical and it is derived from one of the following polyhalogenopyrimidines: 2,4,6-trichloropyrimidine or 2,4,6-tribromopyrimidine or their derivatives which are substituted in the 5-position, for example by methyl, ethyl, carboxymethyl, chloromethyl or bromomethyl, 5-bromo-2,4,6-trichloropyrimidine, 2,4,5,6-tetrachloro- or 2,4,5,6-tetrabromopyrimidine, 2,4-dichloro-5-chloromethyl-6-methylpyrimidine, 2,4-dibromo-5-bromomethyl-6-methylpyrimidine, 2,4-dichloro-5-chloromethylpyrimidine or 2,4-dibromo-5-bromomethylpyrimidine.

The copper-containing dye of Formula IV can be produced as follows: The diazo compound of an amine of Formula B—NH$_2$ is coupled in acid medium with a coupling component of formula

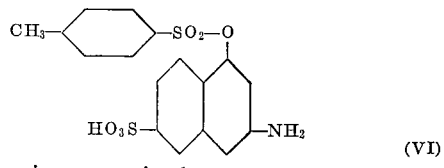

the primary amino group in the resulting monoazo dye is exchanged for the hydroxyl group, e.g. by treatment with nitrous acid at 10–50° C. (cf. Swiss Patents 278,942 and 281,980 to 281,987), to give a dye of formula

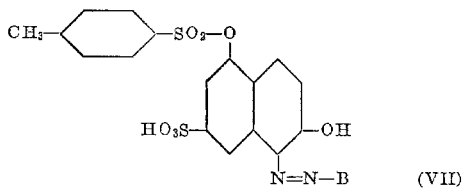

(VII)

which is coppered with oxidation, e.g. by the method of German Patent 807,289, to the copper complex dye of the following formula

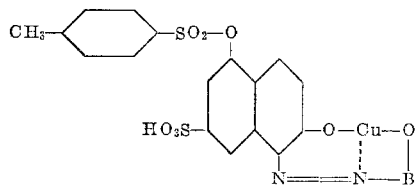

and this is hydrolysed to form the dye of Formula IV. The following B—NH₂ amines may be mentioned as examples of those suitable for the production of the dyes of Formula IV: 1-aminobenzene-3- and 1-aminobenzene-4-sulfonic acid, 1-amino-4-methyl-, 1-amino-4-ethyl, 1-amino-4-isopropyl-, 1-amino-4-tert.-butyl- and 1-amino-4-tert.-octylbenzene-3-sulfonic acid, 1-aminonaphthalene-4-, -5-, -6-, -7- and -8-sulfonic acid, 1-amino-naphthalene 5,7--4,8-, -4,6- and, -4,7-disulfonic acid and -4,6,8-trisulfonic acid, 2-aminonaphthalene-5-, -6- and -7-sulfonic acid, 2-aminonaphthalene-4,8-, -5,7- and -6,8-disulfonic acid and -4,6,8-trisulfonic acid.

In place of the B—NH₂ amines, amines may be chosen for the production of the dyes of Formula IV which bear in ortho-position to the amino group a sulfonic acid group which is replaced in oxidative coppering by —OH—or —O—Cu—. Examples of such amines are 1-aminobenzene-2,4- and -2,5-disulfonic acid, 2-aminonaphthalene-1,5-disulfonic acid, 1-aminonaphthalene-2,4,6-, -2,4,7-, -2,4,8- and -2,5,7-trisulfonic acid.

The coupling reaction of the diazo compounds of amines of Formulae III or V with coupling components of Formula IV is carried out to best advantage in weakly acid to alkaline medium, for example in the pH range of 6 to 9, and at temperatures of 0° to 25° C. or preferably 0° to 10° C.

When the diazo component used is one of Formula III the coupling reaction completes the process and the copper-containing reactive dye thus formed can be salted out, filtered off and dried.

In cases where the diazo component is one of Formula V the acyl group is split off after coupling. It is best to effect cleavage in an alkaline medium, e.g. in sodium hydroxide or potassium hydroxide solution of 2 to 10% or preferably 3 to 5% strength, at temperatures of 80° C. to the boil or preferably 90–95° C. Under these alkaline conditions the dye is not decoppered.

The reaction of the amino group with the polyhalogenopyrimidines is carried out preferably in aqueous medium, to which the halide can be added as it is or in solution in an organic solvent. Solvents specially suitable for the halogenopyrimidines are acetone, benzene, chlorobenzene and toluene.

The reaction temperature may vary within wide limits, e.g. from 20° to 100° C. If temperatures higher than about 40° C. are necessary it is advisable to employ a reaction vessel fitted with a reflux condenser, because the halogenopyrimidines are volatile in water vapour.

The reaction is carried out to advantage in a weakly alkaline, neutral or weakly acid medium. To neutralise the equivalent of hydrogen halide that is formed, an acid-binding agent such as sodium acetate can be added to the reaction solution at the commencement of the operation, or alternatively small portions of sodium or potassium carbonate or bicarbonate can be added in solid, pulverised form or in concentrated aqueous solution in the course of the reaction. Other suitable neutralising agents are sodium or potassium hydroxide in aqueous solution. The addition of small amounts of a wetting or emulsifying agent to the reaction mixture can accelerate the rate of reaction.

On completion of the reaction with the polyhalogenopyrimidine the dyes can be isolated in the aforestated manner.

The new copper-containing reactive dyes show little sensitivity to salt and have good solubility in water, so that the proportion of dye not chemically linked with the fibre can be easily washed off after application. The dyes are well suitable for the dyeing of leather and for the dyeing, padding and printing of wool, silk, polyamide fibres, and fibres of natural or regenerated cellulose, in particular by exhaustion dyeing methods.

The pad dyeings and prints on cellulosic fibre materials produced with these dyes are aftertreated in alkaline medium, if necessary at a moderately high temperature, with subsequent soaping. They have good fastness to light in the dry and wet states and to water, washing and other wet tests, acid and alkaline perspiration, rubbing, alkalis and boiling, and are stable to resin crease-resist finishing processes.

The dyeings obtained on wool and polyamide fibres, especially when submitted to a weakly alkaline aftertreatment, have good fastness to light, water, washing, milling, perspiration, stoving, rubbing, dry cleaning and chlorinated swimming pool water, and show good resistance to weak acids such as acetic acid and to acid hydrolysis.

In the following examples the parts and percentages are by weight and the temperatures in degrees centigrade.

EXAMPLE 1

80 parts of the tetrasodium salt of the dye of formula

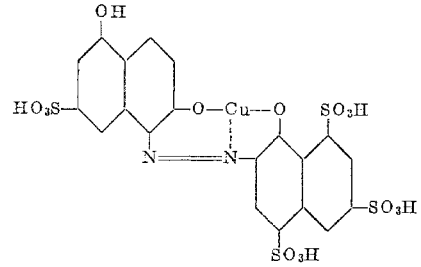

are dissolved in 250 parts of water at 70° and the solution is cooled to 10°. At this temperature is added the diazo compound of 37 parts of 1-amino-3-(2',5',6'-trichloropyrimidyl-4'-amino)-benzene-6-sulfonic acid, on which the solution is stirred at pH 6–7 until the reaction has run its course, which takes about 2 hours. The disazo dye formed is precipitated by adding sodium chloride and is filtered off and dried. It is then a dark powder which dissolves in water to give blue solutions and dyes cotton in navy blue shades.

DYEING METHOD 2 parts of the dye obtained as in Example 1 are dissolved in 4000 parts of softened water at 40°. Into this bath are entered 100 parts of a previously wetted-out fabric of mercerised cotton. Then the dyebath is set with 110 parts of calcined sodium sulfate and 30 parts of calcined sodium carbonate and its temperature is increased to 100° in 30 minutes, with further additions of 110 parts of calcined sodim sulfate after 10 minutes and 100 parts of the same after 20 minutes. On reaching the boil a further 50 parts of calcined sodium carbonate are added. The bath is held at the boil for 1 hour. After this time the dyed fabric is removed, rinsed with water and dried. The navy blue dyeing obtained is fast to light and wet treatments.

EXAMPLE 2

70 parts of the trisodium salt of the dye of formula

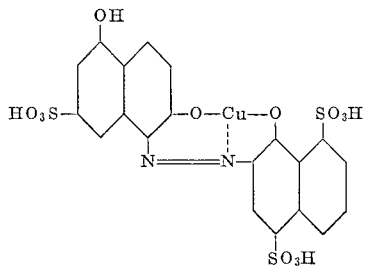

are dissolved in 500 parts of water at 70°. The solution is cooled to 10° and at this temperature the diazo compound of 41 parts of 4-amino-4'-acetylaminostilbene-2,2'-disulfonic acid is added. The solution is then stirred at pH 8–9 until the coupling reaction is complete, which requires a few hours. The disazo dye formed is separated by the addition of sodium chloride and filtered off. The filter cake is entered into 800 parts of a 5% sodium hydroxide solution and stirred for 1 hour at 90–95°, after which time deacetylation is complete. The aminodisazo compound is salted out with sodium chloride, filtered off and washed with sodium chloride solution.

The filter cake is dissolved in 500 parts of hot water and the pH of the solution adjusted to 6 with a few drops of glacial acetic acid. 19.5 parts of 2,4,5,6-tetrachloropyrimidine are added and it is stirred for 30 minutes at 90°. During the condensation reaction the pH is kept at 5–6 by dropping in a dilute sodium carbonate solution. The dye formed is precipitated with sodium chloride, isolated and dried. It is obtained as a dark powder which dissolves in water with a blue coloration and dyes cotton in navy blue shades.

EXAMPLE 3

70 parts of the trisodium salt of the coppered monoazo dye described in Example 2 are dissolved in 500 parts of water at 70°. After cooling to 10° the diazo compound of 37 parts of 1-amino-4-(2',5',6'-trichloropyrimidyl-4'-amino)-benzene-2-sulfonic acid is added to the solution, which is then stirred at pH 6–7 until the coupling reaction is complete, which is the case after about 12 hours. The disazo dye formed is precipitated with sodium chloride, filtered off and dried. It is then a dark powder which forms blue solutions in water and dyes cotton in navy blue shades.

EXAMPLE 4

80 parts of the tetrasodium salt of the coppered monoazo dye described in Example 1 are dissolved in 250 parts of water and the solution is cooled to 10°, on which the diazo compound of 39 parts of 4-amino-4'-(2'',5'',6''-trichloropyrimidyl-4''-amino)-1,1'-diphenyl-3-sulfonic acid is added. The solution is stirred at pH 6–7 until the coupling reaction is complete, which requires about 20 hours. The resulting disazo dye is precipitated by adding sodium chloride and is filtered off and dried, to give a dark powder which dissolves in water with a blue coloration. It gives navy blue shades on cotton.

EXAMPLE 5

55 parts of the disodium salt of the dye of formula

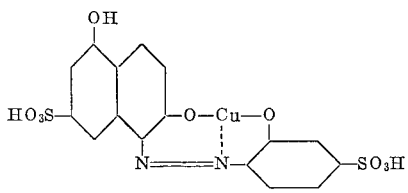

are dissolved in 500 parts of water at 50°. The solution is cooled to 10° and at this temperature the diazo compound of 36 parts of 2-amino-6-acetylaminonaphthalene-4,8-disulfonic acid is added. The solution is stirred at pH 7–8 for 2 hours, on which the coupling reaction is complete. The disazo dye formed is precipitated by adding sodium chloride and filtered off. The filter cake is entered into 1000 parts of a 5% sodium hydroxide solution and stirred for 1½ hours at 90–95°, which brings about complete deacetylation. The aminodisazo dye is salted out with sodium chloride and filtered off.

The filter cake is dissolved in 500 parts of hot water and the solution adjusted to pH 6 with a few drops of glacial acetic acid. 19.5 parts of 2,4,5,6-tetrachloropyrimidine are added and condensation effected by stirring for 5 hours at 85–90° with simultaneous dropwise addition of dilute sodium carbonate solution to maintain a pH of 5–6. The resulting dye is precipitated with sodium chloride, isolated and dried, on which it is obtained as a dark powder. This dissolves in water to give blue solutions and dyes cotton in reddish navy blue shades.

EXAMPLE 6

80 parts of the tetrasodium salt of the dye of formula

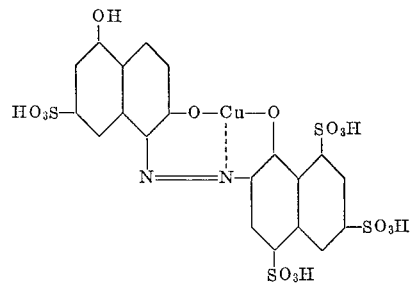

are dissolved in 500 parts of water at 70°. The solution is cooled to 10° and at this temperature the diazo compound of 29 parts of 1-amino-3-(2',5',6'-trichloropyrimidyl-4'-amino)-benzene is added. The solution is stirred at pH 6–7 until the coupling reaction is at an end, which takes about 12 hours. The disazo dye formed is precipitated by adding sodium chloride and is filtered off and dried. It is obtained as a dark powder which forms blue solutions in water and dyes cotton, by the method detailed in Example 1, in navy blue shades.

EXAMPLE 7

80 parts of the monoazo dye described in Example 6 are dissolved in 250 parts of water at 70°. The solution is cooled to 10° and at this temperature is added the diazo compound of 19.5 parts of 1-acetylamino-4-ethoxy-3-aminobenzene. It is then stirred at pH 7–8 for about 12 hours, the period necessary for completion of the coupling reaction. This gives a disazo dye which is precipitated with sodium chloride, filtered off and entered into 1000 parts of 5% sodium hydroxide solution, in which it is stirred for 8 hours at 90–95° for complete deacetylation. By the addition of hydrochloric acid the pH value of the solution is adjusted to 5.5 and the disazo dye is precipitated by adding sodium chloride and filtered off. The filter cake is dissolved in 900 parts of water at 60°, with the subsequent addition of 19.5 parts of 2,4,5,6-tetrachloropyrimidine. The solution is stirred for 2 hours at 80–90° to effect condensation, while the pH is maintained at 5–6 during this time by dropping in dilute sodium carbonate solution. The final dye is precipitated by adding sodium chloride. After isolation and drying it is obtained as a dark powder which dissolves in water with a blue coloration and dyes cotton in navy blue shades.

Further copper-containing reactive dyes which are obtained by the process of the present invention are set forth in the following table. They are distinguished in columns (I) to (IV) respectively by the diazo component of Formula III or V, the diazo component B—NH₂, the reactive component (when this is introduced later by reaction with the aminodisazo dye), and the shade of the dyeing given by the dye on cellulosic fibres.

TABLE

| Ex. | Diazo component of Formula (III) or (V) (I) | Diazo component B—NH₂ (II) | Reactive component (III) | Shade of dyeing on cellulosic fibres (IV) |
|---|---|---|---|---|
| 8 | 4-amino-4'-acetylaminostilbene-2,2'-disulfonic acid. | 1-aminobenzene-4-sulfonic acid | 2,4,5,6-tetrachloropyrimidine | Reddish navy blue. |
| 9 | do | 1-aminobenzene-3-sulfonic acid | 2,4,6-trichloropyrimidine | Do. |
| 10 | do | 2-aminonaphthalene-6,8-di-sulfonic acid | do | Navy blue. |
| 11 | do | 2-aminonaphthalene-4,6,8-trisulfonic acid | do | Do. |
| 12 | 1-amino-4-(2',5',6'-trichloropyrimidyl-4'-amino)-benzene-6-sulfonic acid. | do | do | Do. |
| 13 | 4-amino-4'-(2'',5'',6''-trichloropyrimidyl-4''-amino)-1,1'-diphenyl-3-sulfonic acid. | do | do | Do. |
| 14 | 1-amino-3-acetylaminobenzene-6-sulfonic acid | 2-aminonaphthalene-4,8-disulfonic acid | 2,4,5,6-tetrachloropyrimidine | Do. |
| 15 | 1-amino-4-acetylaminobenzene-6-sulfonic acid | do | 5-chloromethyl-2,4-dichloro-6-methylpyrimidine. | Do. |
| 16 | 4-amino-4'-(2'',5'',6''-trichloropyrimidyl-4''-amino)-1-1'-diphenyl-3-sulfonic acid. | do | | Do. |
| 17 | 1-amino-3-(2',5',6'-trichloropyrimidyl-4'-amino)-benzene-6-sulfonic acid. | 2-aminonaphthalene-6,8-disulfonic acid | | Do. |
| 18 | 1-amino-4-(2',5',6'-trichloropyrimidyl-4'-amino)-benzene-6-sulfonic acid. | do | | Do. |
| 19 | 2-amino-6-acetylaminonaphthalene-4,8-disulfonic acid. | 2-aminonaphthalene-4,6,8-trisulfonic acid | 2,4,6-trichloropyrimidine | Do. |
| 20 | do | 2-aminonaphthalene-4,8-disulfonic acid | 2,4,5,6-tetrachloropyrimidine | Do. |
| 21 | do | 1-aminobenzene-4-sulfonic acid | | Reddish navy blue. |
| 22 | 4-amino-4'-acetylaminostilbene-2,2'-disulfonic acid. | 2-aminonaphthalene-4,8-disulfonic acid | | Navy blue. |
| 23 | 1-amino-4-acetylaminobenzene-6-sulfonic acid | 1-aminonaphthalene-2,5,7-trisulfonic acid | 2,4,6-trichloropyrimidine | Do. |
| 24 | 1-amino-3-(2',5',6'-trichloropyrimidyl-4'-amino)-benzene-6-sulfonic acid. | 2-aminonaphthalene-4,6,8-trisulfonic acid | | Do. |
| 25 | 1-amino-4-(2',6'-dichloropyrimidyl-4'-amino)-benzene-6-sulfonic acid. | do | | Do. |
| 26 | 1-amino-4-acetylaminobenzene-6-sulfonic acid | 2-aminonaphthalene-5,7-disulfonic acid | 2,4,5,6-tetrachloropyrimidine | Do. |
| 27 | 1-amino-3-acetylaminobenzene-6-sulfonic acid | do | 2,4,6-trichloropyrimidine | Do. |
| 28 | 1-amino-4-(2',5',6'-trichloropyrimidyl-4'-amino)-benzene. | 2-aminonaphthalene-4,6,8-trisulfonic acid | | Do. |
| 29 | 1-amino-4-acetylaminobenzene | do | 2,4,5,6-tetrachloropyrimidine | Do. |
| 30 | 3-amino-1-propionylamino-4-methoxybenzene | do | 2,4,6-trichloropyrimidine | Do. |
| 31 | 1-amino-4-(2',4'-dichloro-6'-methylpyrimidyl-5'-methyleneamino)-benzene. | do | | Do. |
| 32 | 3-amino-1-(2',5',6'-trichloropyrimidyl-4'-amino)-4-methylbenzene. | do | | Do. |
| 33 | 3-amino-1-acetylamino-4-ethylbenzene | do | 2,4,6-tribromopyrimidine | Do. |
| 34 | 1-amino-4-acetylamino-2-methylbenzene | do | 2,4,5,6-tetrabromopyrimidine | Do. |
| 35 | 1-amino-4-acetylamino-2-ethylbenzene | do | 5-bromo-2,4,6-trichloropyrimidine | Do. |
| 36 | 1-amino-4-acetylamino-2-methoxybenzene | do | 2,4-dibromo-5-bromomethyl-6-methylpyrimidine. | Do. |
| 37 | 1-amino-4-acetylamino-2-ethoxybenzene | do | 2,4-dichloro-5-chloromethylpyrimidine. | Do. |
| 38 | 1-amino-3-(2',5',6'-trichloropyrimidyl-4'-amino)-benzene. | 1-aminonaphthalene-4,6,8-trisulfonic acid | | Do. |
| 39 | 1-amino-3-N-methyl-N-acetylamino-benzene | 1-amino-naphthalene-4,6,8-trisulfonic acid | 2,4,6-trichloro-5-carboxymethyl-pyrimidine | Do. |
| 40 | 1-amino-4-N-ethyl-N-ethoxycarbonylamino-benzene. | 2-amino-naphthalene-4,6,8-trisulfonic acid | do | Do. |
| 41 | 2-amino-6-acetylamino-naphthalene-4,8-disulfonic acid. | 1-aminobenzene-2,4-disulfonic acid | do | Do. |
| 42 | do | 1-aminonaphthalene-4-sulfonic acid | 2,4,6-trichloro-5-methylpyrimidine | Do. |
| 43 | do | 2-aminonaphthalene-5-sulfonic acid | 2,4,6-trichloropyrimidine | Do. |
| 44 | do | 2-aminonaphthalene-1,5-disulfonic acid | do | Do. |
| 45 | do | 1-aminonaphthalene-6-sulfonic acid | do | Do. |
| 46 | do | 1-aminonaphthalene-8-sulfonic acid | do | Do. |
| 47 | do | 1-aminonaphthalene-2,4,7-trisulfonic acid | do | Do. |
| 48 | 4-amino-4'-acetylamino-2,2'-dimethyl-1,1'-diphenyl-5-sulfonic acid. | 2-aminonaphthalene-4,6,8-trisulfonic acid | 2,4,6-trichloropyrimidine | Do. |
| 49 | 4-amino-4'-acetylaminodiphenylamine-2-sulfonic acid. | do | 2,4,5,6-tetrachloropyrimidine | Do. |
| 50 | 1-amino-3-methoxycarbonylamino-6-chlorobenzene. | do | do | Do. |
| 51 | 1-amino-4-propionyl-amino-6-chlorobenzene | do | do | Do. |
| 52 | 1-amino-3-acetylaminobenzene-6-sulfonic acid | 1-aminonaphthalene-5,7-disulfonic acid | 2,4,5,6-tetrachloropyrimidine | Do. |
| 53 | do | 1-aminonaphthalene-4,6-disulfonic acid | 2-4-6-trichloropyrimidine | Do. |
| 54 | do | 1-aminonaphthalene-2,4,8-trisulfonic acid | do | Do. |
| 55 | 4-amino-4'-acetylamino-2,2'-dimethoxy-1,1'-diphenyl-5-sulfonic acid. | 2-aminonaphthalene-4,6,8-trisulfonic acid | 5-bromo-2,4,6-trichloropyrimidine | Do. |
| 56 | 4-amino-4'-acetylamino-2,2'-dichloro-1,1'-diphenyl-5-sulfonic acid. | do | 2,4,5,6-tetrachloropyrimidine | Do. |
| 57 | 2-amino-6-acetylaminonaphthalene-4,8-disulfonic acid. | 1-aminobenzene-2,5-disulfonic acid | 2,4,6-trichloro-5-chloromethyl-pyrimidine. | Do. |
| 58 | do | 1-amino-4-isopropylbenzene-3-sulfonic acid | 2,4,5,6-tetrachloropyrimidine | Do. |
| 59 | 1-amino-3-acetylaminobenzene-6-sulfonic acid | 2-aminonaphthalene-4,6-disulfonic acid | 2,4-dibromo-5-bromomethyl-6-methylpyrimidine. | Do. |
| 60 | do | do | 2,4,6-tribromo-5-bromomethylpyrimidine. | Do. |
| 61 | 1-amino-4-acetylaminobenzene | 2-aminonaphthalene-4,6,8-trisulfonic acid | 2,4,6-trichloro-5-ethylpyrimidine | Do. |
| 62 | 2-amino-6-acetylaminonaphthalene-4,8-disulfonic acid. | 2-aminonaphthalene-8-sulfonic acid | 2,4,6-trichloropyrimidine | Do. |
| 63 | 2-amino-6-acetylamino-naphthalene-4,8-disulfonic acid. | 1-aminonaphthalene-5-sulfonic acid | do | Do. |
| 64 | do | 1-amino-4-ethylbenzene-3-sulfonic acid | do | Do. |
| 65 | 4-amino-4'-acetylaminostilbene-2,2'-disulfonic acid. | 2-aminonaphthalene-7-sulfonic acid | do | Do. |
| 66 | do | 1-aminonaphthalene-4,7-disulfonic acid | do | Do. |

TABLE—Continued

| Ex. | Diazo component of Formula (III) or (V) (I) | Diazo component B—NH₂ (II) | Reactive component (III) | Shade of dyeing on cellulosic fibres (IV) |
|---|---|---|---|---|
| 67 | ....do.... | 1-aminonaphthalene-2,4,6-trisulfonic acid. | ....do.... | Do. |
| 68 | 2-amino-6-acetylaminonaphthalene-4,8-disulfonic acid. | 2-aminonaphthalene-6-sulfonic acid. | 2,4,5,6-tetrachloropyrimidine | Do. |
| 69 | ....do.... | 1-amino-4-methylbenzene-3-sulfonic acid. | ....do.... | Do. |
| 70 | ....do.... | 1-aminonaphthalene-7-sulfonic acid. | ....do.... | Do. |

Formulae of representative dyes of the foregoing examples are as follows

EXAMPLE 1

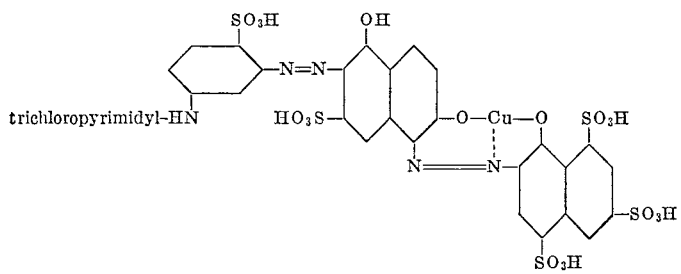

EXAMPLE 2

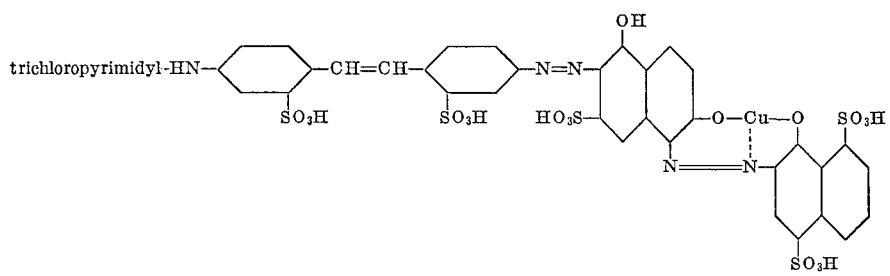

EXAMPLE 3

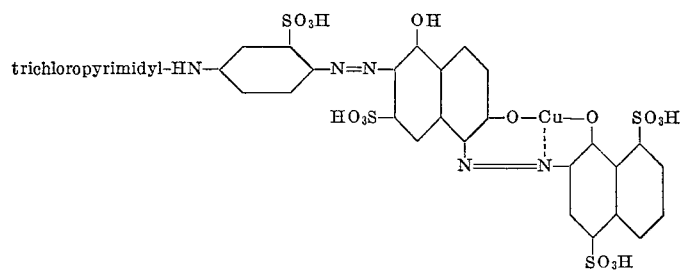

EXAMPLE 4

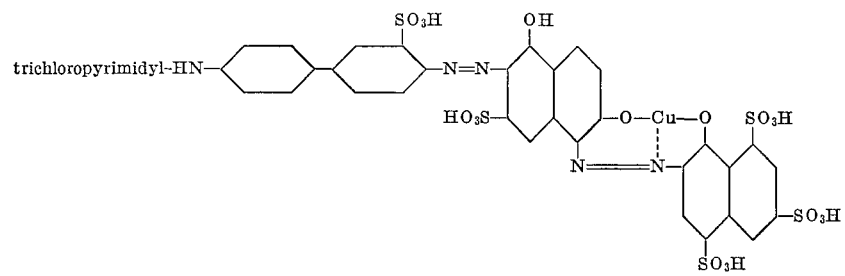

EXAMPLE 5

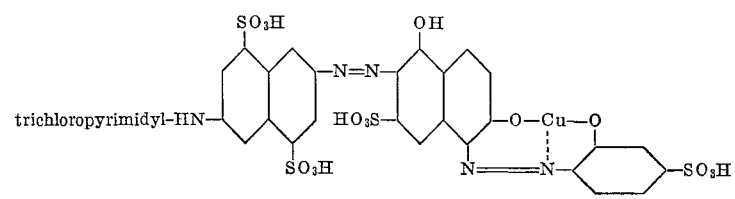

EXAMPLE 6

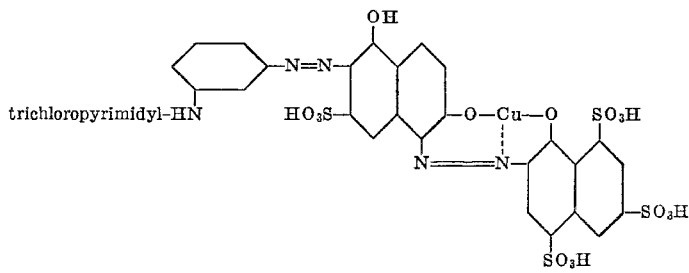

EXAMPLE 7

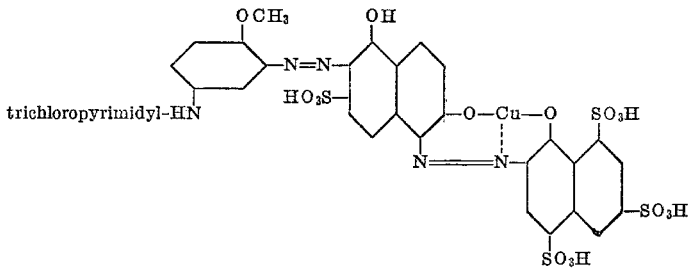

EXAMPLE 12

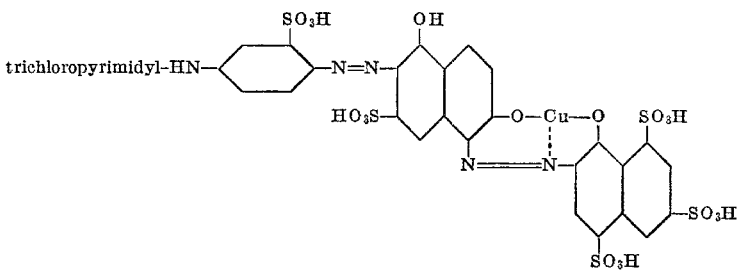

EXAMPLE 29

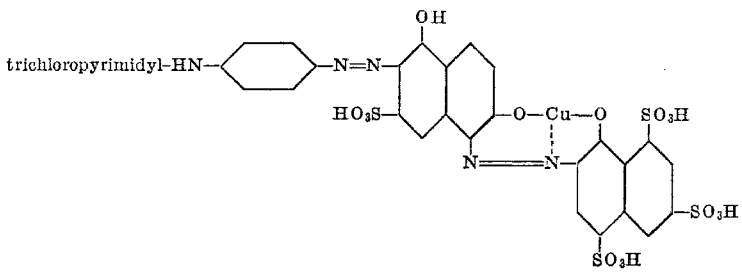

Having thus disclosed the invention what we claim is:
1. A water-soluble, copper-containing reactive dye of the formula

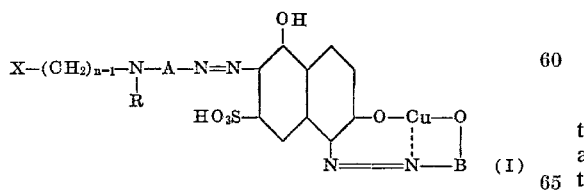

wherein

A is a member selected from the group consisting of an unsulfonated benzene radical, a sulfonated benzene radical, a sulfonated naphthalene radical, a sulfonated diphenyl radical, a sulfonated diphenylamine radical and a sulfonated stilbene radical, B is a member selected from the group consisting of a sulfonated benzene radical and a sulfonated naphthalene radical, R is a member selected from the group consisting of hydrogen and lower alkyl, X is a polyhalopyrimidyl radical selected from the group consisting of polychloro- and polybromopyrimidyl radical, any non-halo substituent thereof being selected from the group consisting of lower alkyl and carboxymethyl, and $n$ is one of the integers 1 and 2, the whole dye molecule containing from 4 to 6 sulfonic acid groups and —O— being bound to B in ortho position to —N=N—.

2. A dye according to claim 1, the molecular structure of which contains from 4 to 6 sulfonic acid groups and the dye is a member selected from the group consisting of a naphthalene-azo-naphthalene-azo-benzene dye, a stilbene-azo-naphthalene - azo - benzene dye, a benzene-azo-naphthalene - azo - naphthalene dye, a naphthalene-azo-naphthalene-azo-naphthalene dye, a diphenyl-azo-naphthalene-azo-naphthalene dye, a diphenyl-azo-naphthalene-azo-naphthalene dye and a stilbene-azo-naphthalene-azo-naphthalene dye.

3. A dye according to claim 1 the molecular structure of which contains from 4 to 6 sulfonic acid groups and wherein any other substituent of A is a member selected from the group consisting of methoxy, ethoxy, methyl, ethyl and chloro; any further substituent of sulfonated benzene radical B is an alkyl having from 1 to 8 carbon atoms; sulfonated naphthalene radical B contains from 1 to 3 sulfonic acid groups as sole substituent; and any lower alkyl bound to the pyrimidyl ring of X is a number selected from the group consisting of methyl and ethyl.

4. Water-soluble, copper-containing reactive dye according to claim 1 of the formula

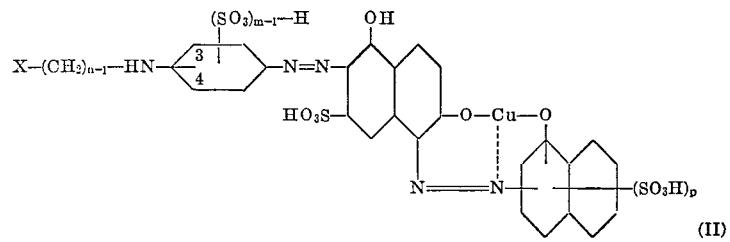

(II)

wherein each of $n$ and $m$ of is one of the integers 1 and 2 and $p$ is one of the integers 2 and 3, the sum $m+p$ being at least 4, and the group —O— being in ortho position to —N=N— and —HN— being in one of the 3 and 4 positions of the benzene nucleus.

5. The water-soluble, copper-containing reactive dye of the formula

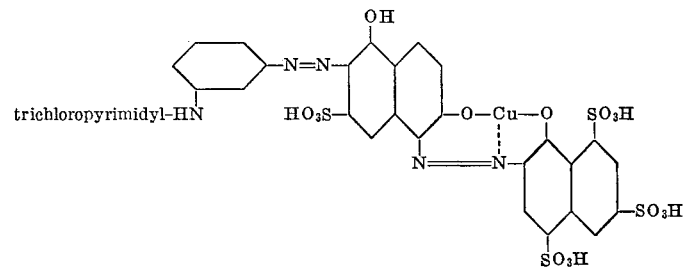

6. The water-soluble, copper-containing reactive dye of the formula

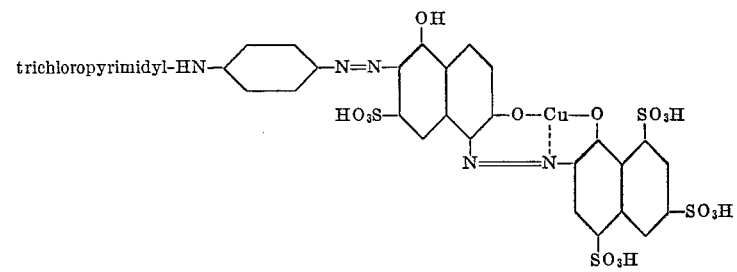

7. The water-soluble, copper-containing reactive dye of the formula

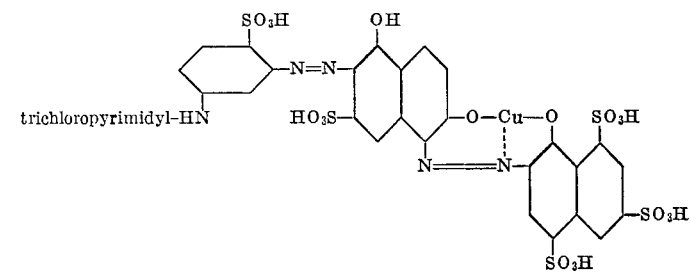

8. The water-soluble, copper-containing reactive dye of the formula
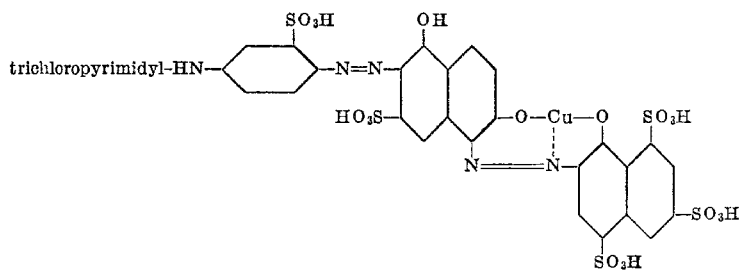
9. The water-soluble, copper-containing reactive dye of the formula
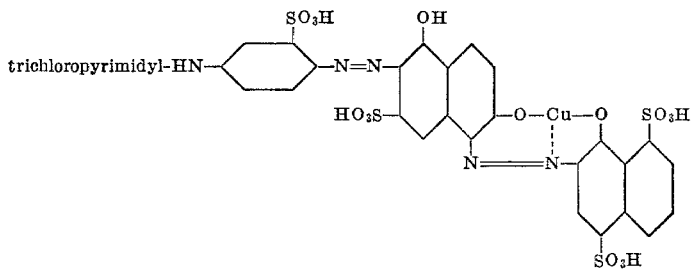
References Cited
UNITED STATES PATENTS
3,317,507  5/1967  Schundehutte et al. ___ 260—145
CHARLES B. PARKER, Primary Examiner
DONALD M. PAPUGA, Assistant Examiner
U.S. Cl. X.R.
8—13, 51, 42, 54, 55; 260—150, 151, 154, 200, 195, 256.4

PO-1050
(5/69)

UNITED STATES PATENT OFFICE
CERTIFICATE OF CORRECTION

Patent No. 3,492,284          Dated January 27, 1970

Inventor(s) JAKOB BENZ; HANSPETER UEHLINGER and WALTER WEHRLI

It is certified that error appears in the above-identified patent and that said Letters Patent are hereby corrected as shown below:

Column 2, line 5, in the formula

" 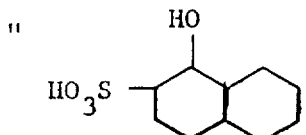 " should read -- 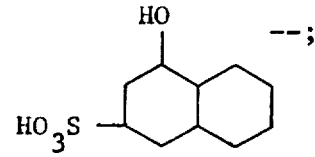 --;

line 65, in the formula

" 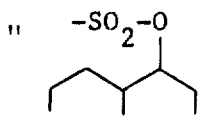 " should read -- 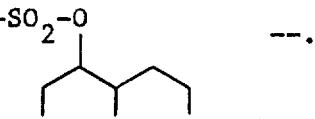 --.

Column 3, line 23 should start a new paragraph -- The following--; line 29, "5,7-" should read --5,7-,--. Column 7, in the table, in Example 16, "amino)-1-1'-" should read --amino)-1,1'- --; in Example 48, "-1,1'di-" should read ---1,1'-di- --. Column 8, in the table, under the heading "Reactive component (III), in Example 21, insert --do--; in Example 22, insert --2,4,5,6-tetrachloropyrimidine--.
Column 13, line 8, "substituent;" should read --substituents;--; line 9, "number" should read --member--; line 13, in the formula " 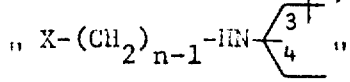 " should read -- 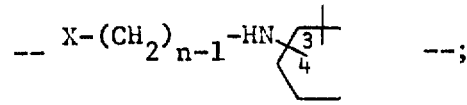 --;

in the formula

" 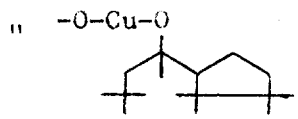 " should read -- 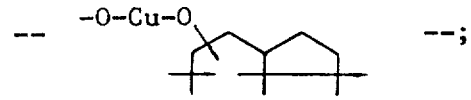 --;

SIGNED AND
SEALED
JUL 28 1970

(SEAL)
Attest:

Edward M. Fletcher, Jr.
Attesting Officer

WILLIAM E. SCHUYLER, JR.
Commissioner of Patents

UNITED STATES PATENT OFFICE
CERTIFICATE OF CORRECTION

Patent No. 3,492,284                Dated January 27, 1970

Inventor(s) JAKOB BENZ, HANSPETER UEHLINGER and WALTER WEHRLI

It is certified that error appears in the above-identified patent and that said Letters Patent are hereby corrected as shown below:

Column 12, line 59, "radical," should read --radicals,--. Column 13, line 25, delete "of" (second occurrence).

SIGNED AND
SEALED
SEP 15 1970

(SEAL)
Attest:

Edward M. Fletcher, Jr.
Attesting Officer

WILLIAM E. SCHUYLER, JR.
Commissioner of Patents